United States Patent
Sedlácek et al.

(10) Patent No.: US 8,541,900 B2
(45) Date of Patent: Sep. 24, 2013

(54) FLUID TURBINE

(75) Inventors: Miroslav Sedlácek, Prague (CZ); Václav Beran, Prague (CZ); Jiri Novák, Kladno (CZ)

(73) Assignee: Czech Technical University in Prague, Faculty of Civil Engineering, Prague (CZ)

( * ) Notice: Subject to any disclaimer, the term of this patent is extended or adjusted under 35 U.S.C. 154(b) by 609 days.

(21) Appl. No.: 12/671,918

(22) PCT Filed: Apr. 10, 2008

(86) PCT No.: PCT/CZ2008/000042
§ 371 (c)(1),
(2), (4) Date: Nov. 24, 2010

(87) PCT Pub. No.: WO2009/018788
PCT Pub. Date: Feb. 12, 2009

(65) Prior Publication Data
US 2011/0101695 A1    May 5, 2011

(30) Foreign Application Priority Data

Aug. 3, 2007  (CZ) ............................... PV 2007-520

(51) Int. Cl.
*F01D 3/00*  (2006.01)

(52) U.S. Cl.
USPC .................................. 290/52; 290/43; 290/54

(58) Field of Classification Search
USPC ............................................. 290/43, 52, 54
See application file for complete search history.

(56) References Cited

U.S. PATENT DOCUMENTS

| | | | | |
|---|---|---|---|---|
| 4,555,637 A * | 11/1985 | Irvine | | 290/52 |
| 4,740,711 A * | 4/1988 | Sato et al. | | 290/52 |
| 5,497,615 A * | 3/1996 | Noe et al. | | 60/39.511 |
| 5,505,587 A * | 4/1996 | Ghetzler | | 415/49 |
| 5,659,205 A * | 8/1997 | Weisser | | 290/52 |
| 6,270,309 B1 * | 8/2001 | Ghetzler et al. | | 415/35 |
| 6,294,842 B1 * | 9/2001 | Skowronski | | 290/7 |
| 6,495,929 B2 * | 12/2002 | Bosley et al. | | 290/52 |
| 7,521,815 B2 * | 4/2009 | Lee et al. | | 290/52 |
| 2011/0097190 A1 * | 4/2011 | Bertels | | 415/89 |

FOREIGN PATENT DOCUMENTS

| | | |
|---|---|---|
| CZ | 7606 U1 | 9/1998 |
| CZ | 20013306 A3 | 4/2003 |
| FR | 2613151 A | 9/1988 |
| WO | 9817910 A | 4/1998 |
| WO | 9961790 A | 12/1999 |
| WO | 0135517 A | 5/2001 |
| ZA | 9802614 A | 10/1998 |

OTHER PUBLICATIONS

International Search Report for corresponding International Application PCT/CZ2008/000042.

* cited by examiner

*Primary Examiner* — Nicholas Ponomarenko
(74) *Attorney, Agent, or Firm* — WRB-IP LLP

(57) ABSTRACT

A fluid turbine includes stator fitted with fluid inlet and outlet, and a rolling rotor installed inside the confusor part of the stator at one end of a shaft, with the other end fixed in a clamp of a clamping mechanism on the stator. The shaft of the rolling rotor is fixed in the clamp of the clamping mechanism non-rotationally with the possibility of angular deflection in all directions. A generator is connected to the shaft.

3 Claims, 2 Drawing Sheets

FLUID TURBINE

BACKGROUND AND SUMMARY

This technical solution involves fluid turbines in the shape of rolling fluid machines comprising a cylindrical or conical stator, in which a rotor of an axially symmetrical shape is seated on the shaft. The rotor touches a stator and can circulate around its internal wall.

Fluid turbines with the rolling principle are generally known, comprising a stator, usually in the shape of a confusor, while the rotor has an axially symmetrical shape, very often a hemisphere or a cone. For example based on Czech patent No. 284483 with the title Rolling Fluid Machine, and European patent No. EP1015760 B1 with the title Rolling Fluid Machine, a water turbine is known, comprising a fluid reservoir with an inlet and at least one outlet nozzle, with a rolling rotor of an axially symmetrical shape placed on a holding device near the outlet nozzle. This machine can operate as a water turbine, when the water flowing around the rotor deflects it towards the internal side of the outlet nozzle and starts rolling it in the outlet nozzle-stator. The solution of the rolling fluid motor in the design patented by Czech patent No. 7606 with the title Hydraulic Motor and European patent No. EP1082538 B1 with the title Hydraulic Motor can be used to produce energy. Likewise, the solution under Czech patent No. 294708 with the title Rolling Fluid Turbine shows a water motor of the rolling type, with hydraulic channels arranged in the places of mutual contact between the rotor and the stator; these channels also act as a geared transmission, preventing rotor slippage inside the stator.

The fundamental disadvantages of the turbines mentioned briefly above is that they have to be fitted with a transmission that transmits the turbine's mechanical output to a power generator. If they are not fitted with a transmission and the rotor and the stator of the rolling turbine constitute a carrying generator, power production has a low efficiency.

It is desirable to adjust the rolling turbine to improve the efficiency of its function, i.e. to make sure that the transformation of the obtained mechanical energy to power does not require any geared transmissions.

According to an aspect of the present invention, a rolling fluid turbine is provided comprising a stator, fitted with at least one inlet hole and at least one outlet hole, where a rolling rotor is arranged in the stator using a shaft and a clamping mechanism, the rotor comprising a body of a rotational shape in conformity with the invention, wherein a power generator is installed inside the rotor and the shaft, on whose one end the rotor is arranged, is seated with its other end fixed firmly in the clamp of the clamping mechanism. The clamping mechanism makes sure that the shaft can longitudinally deflect from its axis in all directions and perform a precessional movement, but cannot rotate around its longitudinal axis. The rolling rotor is arranged on the shaft in a freely rotating manner and constitutes a freely rotating couple with the shaft. Sealing against water penetration inside the rolling rotor is installed between the rolling rotor and the shaft.

The advantage of the solution as per the invention is that the power generator is rotated without any geared transmission in such a manner that the generator is lodged inside the rolling rotor so that the generator's stator is fixed to the rolling rotor and the generator's rotor is fixed to the rolling rotor's shaft, making it a freely rotating couple vs. the rolling rotor and the generator's stator. If a synchronous generator with coils arranged on the rotor is used, the permanent magnets are placed on the stator. The generated power is discharged through power conductors. These conductors are located inside a cavity in the shaft of the rolling rotor.

Advantageously the generator's stator is fixed to the rolling rotor and the shaft of the rolling rotor makes up one unit with the generator's rotor, while the generator's rotor and the rolling rotor constitute a freely rotating couple vs. the shaft with the generator's stator. The rolling rotor in this arrangement can contain an asynchronous generator and the power conductors are placed inside a cavity in the shaft.

Practice has confirmed that if the difference in the diameters of the rolling rotor and the stator is at least 1 cm, the water used can be polluted by soft biological materials with the size of several centimeters, such as residues of grass, leaves, clusters of algae etc. These residues do not affect the turbine's function and pass through it, leaving it in a partly crushed condition.

Presumably the use of the fluid turbine as specified in the invention for flow rates, of about 10 liters per second on heads of up to 15 meters will result in an increased use of these parameters for power generating purposes. Outputs can be expected to be similar as those achieved for the mentioned flow rates and heads by existing rolling turbines, equipped with power generators and employing miscellaneous transmission mechanisms. Depending on the specific installation parameters, their daily outputs are approximately 2-5 kWh of power. The utilization of the marginal flow rates and heads achieved by existing rolling turbines for power generation and ranging around the flow rate of 5 liters per second with the head of 3 meters will be achievable with the fluid turbine as specified in this invention as well. It has been demonstrated that this marginal potential energy has a practical meaning. For example if a 12V/120 W asynchronous generator is used, the mentioned head of 3 m and flow rate of 5 liters per second can be used to generate steadily at least 0.8 kWh of power daily, which is utilized, after the necessary alignment and accumulation, for ordinary household appliances thanks to a 230V, 50 Hz converter.

From an economic point of view, the industrial application of the presented solution consists of or comprises especially in specific forms of production and utilization of the generated power. Very small renewable sources of hydraulic energy can be very important in real economy because the frequency of water micro-sources is very high in certain regions. Their utilization is, however, still absolutely insufficient and inefficient. From the point of view of the presented solution, micro-sources also include all pumping equipment in industrial plants, public facilities, housing projects, where fluids are circulating. In case of a closed circuit of power handling, where the generated power is consumed in the place of its production, the technical solution as specified in this invention can yield major economic benefits. When the costs of maintenance of the equipment are deducted, the benefits will correspond with the saved payments for power supply from the public distribution network. The generated power is first accumulated, and later used as needed. It is not provided to other entities for any fee and is used exclusively for consumption in the place of its production. Its industrial applications include telemetric measurements of industrial systems, linked for example to safety, registration and failure conditions and other functions for applications where connection to the public distribution network is expensive and does not meet the functional needs. The micro-source can perform the function of a backup source for short-term needs and can be activated within a very short period of time.

The presented solution therefore seems to be usable industrially in the field of sustainable development and the determining economic and environmental context. As implied above, no fields of power generation can be excluded from sustainable development in advance. It is therefore necessary to count on the use of micro-properties of potential energy from renewable sources of water and other fluids. The fluid turbine as specified in this invention can become another tool for specific exploitation thanks to its simple design and economic efficiency of its operation as well as the return on investments.

BRIEF DESCRIPTION OF THE DRAWINGS

The fluid turbine will be described in detail using drawings with individual schematic views.

DETAILED DESCRIPTION

Figure 1:
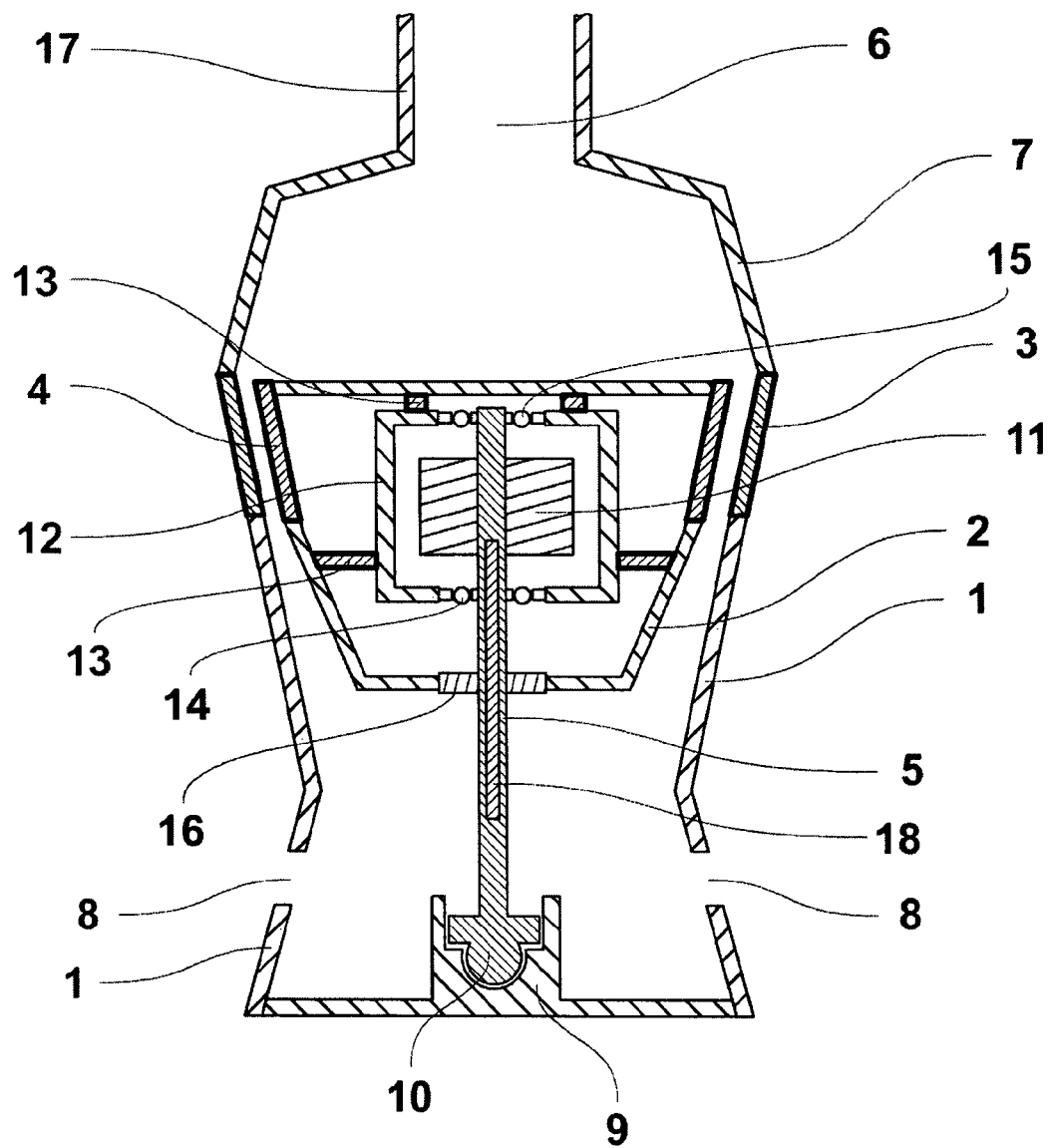
FIG. 1—first embodiment of the fluid turbine as specified in the invention, partial cross-section in side view, where an asynchronous generator with permanent magnets seated along the perimeter of the generator's stator is located inside the rolling rotor and the generator's stator is fixed to the rolling rotor.

One of the specific embodiments of the fluid turbine as specified in the invention is shown schematically in FIG. 1.

The fluid turbine comprises stator 1, which consists, in the direction of fluid supply, of or comprises a confusor 122 mm long and a diffuser 62 mm long attached to it, the diffuser being closed with clamp 9 of clamping mechanism 10. The biggest internal diameter of the confusor is 160 mm and the smaller diameter 109 mm. The smallest internal diameter of the diffuser is 109 mm and the biggest diameter 138 mm. A part of stator 1, in the shape of the confusor, has hydraulic channels 3 on the side of the biggest confusor diameter, the channels being oriented along the longitudinal axis of stator 1 and their length being 43 mm. Using shaft 5, rolling rotor 2 is placed inside stator 1, in the area of the confusor; the rolling rotor having the shape of a blunted cone, the biggest diameter 144 mm, the smallest diameter 85 mm and its length 95 mm. On the side of the biggest diameter rolling rotor 2 is fitted with hydraulic channels 4, oriented along the longitudinal axis of rolling rotor 2 and 43 mm long. Stator 1 on the side of the confusor, i.e. on its biggest diameter, is attached to distributor 7, whose height is 65 mm and which forms, at its narrowed end, inlet 6 with the diameter of 48 mm for the supply of fluid to the turbine; it is connected to supply line X7 with the diameter of 48 mm. In the diffusor part, half down its length, stator 1 is fitted with four outlet holes 8 with the diameter of 21 mm for the discharge of fluid from the turbine.

The bottom end of shaft 5 is fitted with clamping mechanism 10 in the shape of an adjusted spherical bushing, fixed non-rotationally in clamp 9 of clamping mechanism 10. This non-rotational arrangement allows the angular deflection of shaft 5 in all directions and does not allow the rotation of shaft 5 around its longitudinal axis. A synchronous generator is installed at the other end of shaft 5, its stator 12—being fixed to rolling rotor 2 using clamps 13 of the generator's stator 12 and its rotor—11 being fixed to shaft 5. The fixed connection of the generator's rotor—11 to shaft 5 makes up a freely rotating couple vs. the fixed connection of the generator's stator 12 with rolling rotor 2. The conformity of the longitudinal axis of rolling rotor 2 and shaft 5 of rolling rotor 2 is achieved using lower bearing 14 of the generator and upper bearing 15 of the generator. O-ring 16 is fixed to rolling rotor 2 and attached in a freely rotating manner to shaft 5 and restricts the penetration of fluid to the inside of rolling rotor 2.

The fluid, brought through supply line 17, rolls rolling rotor 2 through hydraulic channels 4 on rolling rotor 2 along hydraulic channels 3 of stator 1, thus rotating the generator's stator 12 vs. the generator's rotor—11 and generating power, which is taken away for further utilization by means of conductors in cavity 18 in shaft 5.

Figure 2:
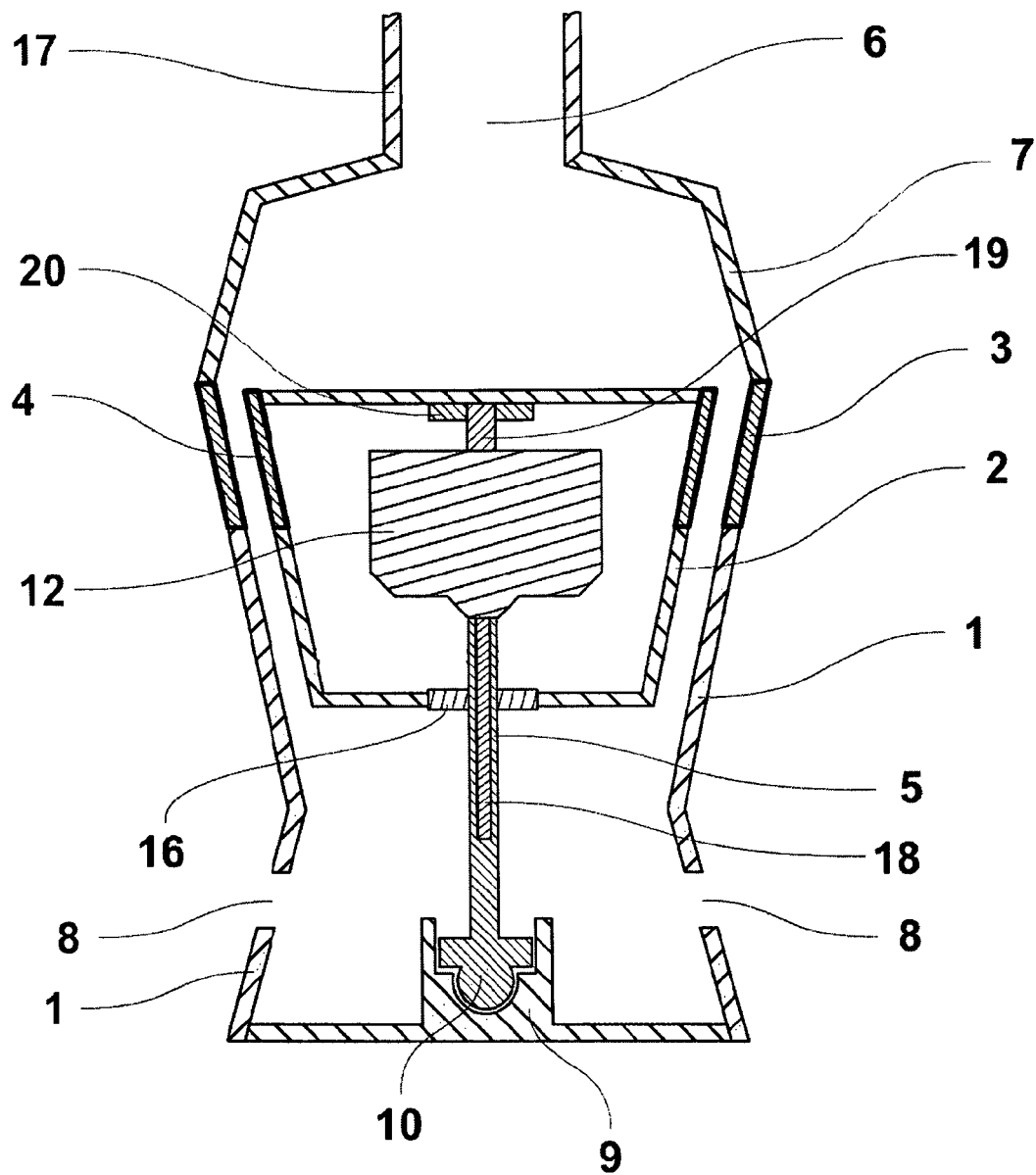
FIG. 2—second embodiment of the fluid turbine as specified in the invention, partial cross-section in side view, where an asynchronous generator, consisting of or comprising an asynchronous electric motor, is located inside the rolling rotor and the shaft of the rotor of the electric motor is fixed to the rolling rotor.

In its advantageous arrangement shown in FIG. 2, an asynchronous motor acting as a power generator is installed in rolling rotor 2.

Compared to the arrangement in FIG. 1, this specific arrangement differs so that the generator's stator 12 is fixed to shaft 5 of rolling rotor 2 and shaft—9 of the generator is fixed using clamp 20 of the generator's shaft 19 to rolling rotor 2.

The fluid brought through supply line 17—rolls rolling rotor 2 by means of hydraulic channels 4 on rolling rotor 2 along hydraulic channels 3 on stator 1, thus rotating the generator's shaft 19 and the generator's rotor—11 against the generator's stator 12 and generating power, which is taken away for further utilization by means of conductors through cavity 18 in shaft 5.

Practical tests identified that the fluid turbine with a generator as specified in this invention, with the rotor diameter of 144 mm and stator diameter of 160 mm, achieved the maximum power output of 68 W. A synchronous generator with permanent magnets placed on the stator was installed inside the rotor; the stator being fixed to the rolling rotor. The head used was 4.8 m and the flow rate 6.9 liters of water per second, and the rotational speed of the generator-rolling rotor was 367 RPM.

It was also verified that the rolling rotor with the diameter of 65 mm, in which a power generator is arranged, can achieve a working rotational speed of 630 to 790 a minute with a head of 8 to 10 meters in practice.

Industrial Utilization

The fluid turbine as specified in the invention can be especially used for the generation of power from very small water flows. It can be used on a head of one meter to several tens of meters depending on the absolute size of the rolling rotor and the stator and the difference between their diameters.

LIST OF PARTS AND SYMBOLS 1 stator
2 rolling rotor 3 hydraulic channels in the stator
4 hydraulic channels in the rotor
5 rolling rotor shaft
6 inlet hole
7 distributor 8 outlet hole
9 clamp of the clamping mechanism
10 clamping mechanism
11 generator's rotor
12 generator's stator 13 clamp of the generator's stator
14 lower bearing of the generator
15 upper bearing of the generator
16 o-ring
17 supply line 18 cavity in the shaft
19 generator shaft
20 clamp of the generator shaft

The invention claimed is:
1. A fluid turbine comprising
a stator, the stator comprising a fluid inlet and a fluid outlet, the stator comprising confusor part and clamp, a shaft comprising a clamping mechanism fixed in the clamp at a first end of the shaft, a rolling rotor installed inside the confusor part of the stator at a second end of the shaft, wherein the shaft is fixed in the clamp so that the shaft is non-rotational relative to the clamp and angularly deflectable in all directions, and a generator connected to the shaft.

2. A fluid turbine as set forth in claim 1, wherein the generator comprises a stator and a rotor, the rotor of the generator being fixed to the shaft, and the stator of the generator is fixed to an internal part of the rolling rotor via a second clamp.

3. A fluid turbine under claim 1, wherein the generator comprises a shaft and a stator, the stator of the generator being fixed to the shaft, and the shaft of the generator is fixed to an internal part of the rolling rotor via a second clamp.

* * * * *